United States Patent [19]

Scheuter et al.

[11] Patent Number: 4,485,397
[45] Date of Patent: Nov. 27, 1984

[54] METHOD FOR PRODUCING PRINTING FORMS WITH IRREGULARLY DISTRIBUTED PRINTING POINTS

[75] Inventors: Karl Scheuter, Darmstadt; Gerhard Fischer, Offenbach, both of Fed. Rep. of Germany

[73] Assignee: Ing. Rudolf Hell GmbH, Fed. Rep. of Germany

[21] Appl. No.: 413,216

[22] Filed: Aug. 30, 1982

[30] Foreign Application Priority Data

Sep. 12, 1981 [EP] European Pat. Off. ........ 81 107207.3

[51] Int. Cl.³ .............................................. H04N 1/40
[52] U.S. Cl. ..................................... 358/283; 358/298
[58] Field of Search ....................... 358/280, 283, 298

[56] References Cited

U.S. PATENT DOCUMENTS 3,725,574  4/1973  Gast ...................................... 358/298
4,339,774  7/1982  Temple ................................ 358/283
4,342,051  7/1982  Suzuki et al. ........................ 358/283

FOREIGN PATENT DOCUMENTS 2107738  8/1972  Fed. Rep. of Germany.
2931098  2/1981  Fed. Rep. of Germany.

OTHER PUBLICATIONS

Chromacom-The Electronic Non-Film Page Make-Up and Retouching System, Dr. Ing. Rudolf Hell GmbH, Kiel, Germany.

*Primary Examiner*—Howard W. Britton
*Assistant Examiner*—John K. Peng
*Attorney, Agent, or Firm*—Hill, Van Santen, Steadman & Simpson

[57] ABSTRACT

A method for producing printing forms by way of irregularly-distributed printing points provides that an image original be opto-electrically scanned across individual surface elements with a desired detail resolution. A gray scale corresponding to the scanning signal is assigned to each surface element and surface elements of the same or approximately the same gradation are combined into sub-surfaces and the individual sub-surfaces are reproduced in accordance with their gradation value by way of a plurality of statistically-distributed printing points whose overall surface coverage within the sub-surface corresponds to the gradation of the sub-surface, whereby the combination of the sub-surfaces is undertaken in accordance with the actual boundaries of the same or approximately the same gradation within the original image.

5 Claims, 12 Drawing Figures

METHOD FOR PRODUCING PRINTING FORMS WITH IRREGULARLY DISTRIBUTED PRINTING POINTS

BACKGROUND OF THE INVENTION

1. Field of the Invention

The present invention relates to a method for producing printing forms with irregularly distributed printing points in which an original image is opto-electrically scanned in individual surface elements with the desired detailed resolution, whereby each surface element has a gradation value corresponding to the scanning signal assigned thereto and surface elements having the same or approximately the same gradation value are combined into sub-surfaces and, corresponding to their gradation value, the individual subsurfaces are reproduced by a plurality of statistically-distributed printing points whose overall area coverage within the sub-surface corresponds to the gradation value of that sub-surface.

2. Description of the Prior Art

A method for producing printing forms has already been proposed in the German patent application P No. 29 31 0928 (corresponding to PCT-OS No. WO 80/00110), fully incorporated herein by this reference, in which a statistical or quasistatistical (stochastic) gradation dependent distribution of the smallest printable points is undertaken on the recording page by way of a random generator. This method operates according to the following steps.

Opto-electrical scanning of the master according to reference surfaces into individual surface elements whose size is determined by the detailed resolution desired in the reproduction, for example $100 \times 100\ \mu^2$, whereby, for example, $6 \times 6$ surface elements form a reference surface which corresponds to a recaording area in which, for example, $12 \times 12$ of the smallest still printable points of the size $50 \times 50\ \mu^2$ are reproducible.

Comparison of the density values within each reference surface obtained during the scanning.

Combination of surface elements of nearly identical density into surface passages having respective, common, mean density.

Identification of the plurality of smallest printable points within each surface passage corresponding to the respective density value, whereby the positions of the points in a printing matrix which serves for the control of the recording are determined by a random process.

Recording in accordance with the data stored in the matrix in a known manner by recording devices standard in scanner technology, for example an exposure unit according to the German Letters Pat. No. 2,107,738, corresponding to U.S. Letters Pat. 3,725,574, fully incorporated herein by this reference.

On the scanning page, a reference surface which is scanned in smaller surface elements corresponds to the size of the printing matrix in this method.

It has been proven, in practice, that surface elements of approximately the same gradation value occasionally extend beyond the reference surface and, therefore, beyond the size of the printing matrix as well, whereby such a surface is sub-divided during recording into equal-sized rectangles or squares. As a result, either a higher-order raster of the size of the reference surface or, respectively, printing matrix arises, which can potentially lead to periodic repetitions of the disposition of the printing point, or the printing matrix must be selected of such size that a periodic repetition within a master is not to be anticipated.

SUMMARY OF THE INVENTION

It is therefore the primary object of the present invention to provide a more simple manner to exclude the aforementioned periodic repetitions.

The above object is achieved in that the combination of the sub-surfaces is undertaken in accordance with the actual boundaries of identical or approximately identical gradation value within the original picture. An advantageous further feature of the invention is that the identification of the surfaces of identical or approximately identical gradation value is undertaken by way of a contour recognition process. The contour recognition is undertaken in an advantageous manner by a comparison of the scanning signal or, respectively, of the gradation values determined therefrom of the individual surface elements, in that, given identical or approximately identical gradation value, the surface elements are combined into sub-surfaces. A further advantageous possibility of identifying the surfaces of identical or nearly identical gradation value is that the combination of the surface elements is undertaken by a contour signal in that all surface elements which lie within two contour lines which correspond to adjacent density values are combined.

It is further advantageously provided that individual elements of the sub-surfaces are suppressed in the re-recording of the sub-surfaces.

BRIEF DESCRIPTION OF THE DRAWINGS

Other objects, features and advantages of the invention, its organization, construction and mode of operation are best understood from the following detailed description, taken in conjunction with the accompanying drawings, on which:

FIGS. 3a and 3b are graphic illustrations of an exemplary embodiment of the invention in which the printing matrix of a surface section or passage according to the flow chart of FIGS. 2a and 2b is illustrated.

DESCRIPTION OF THE PREFERRED EMBODIMENTS

Figure 1:
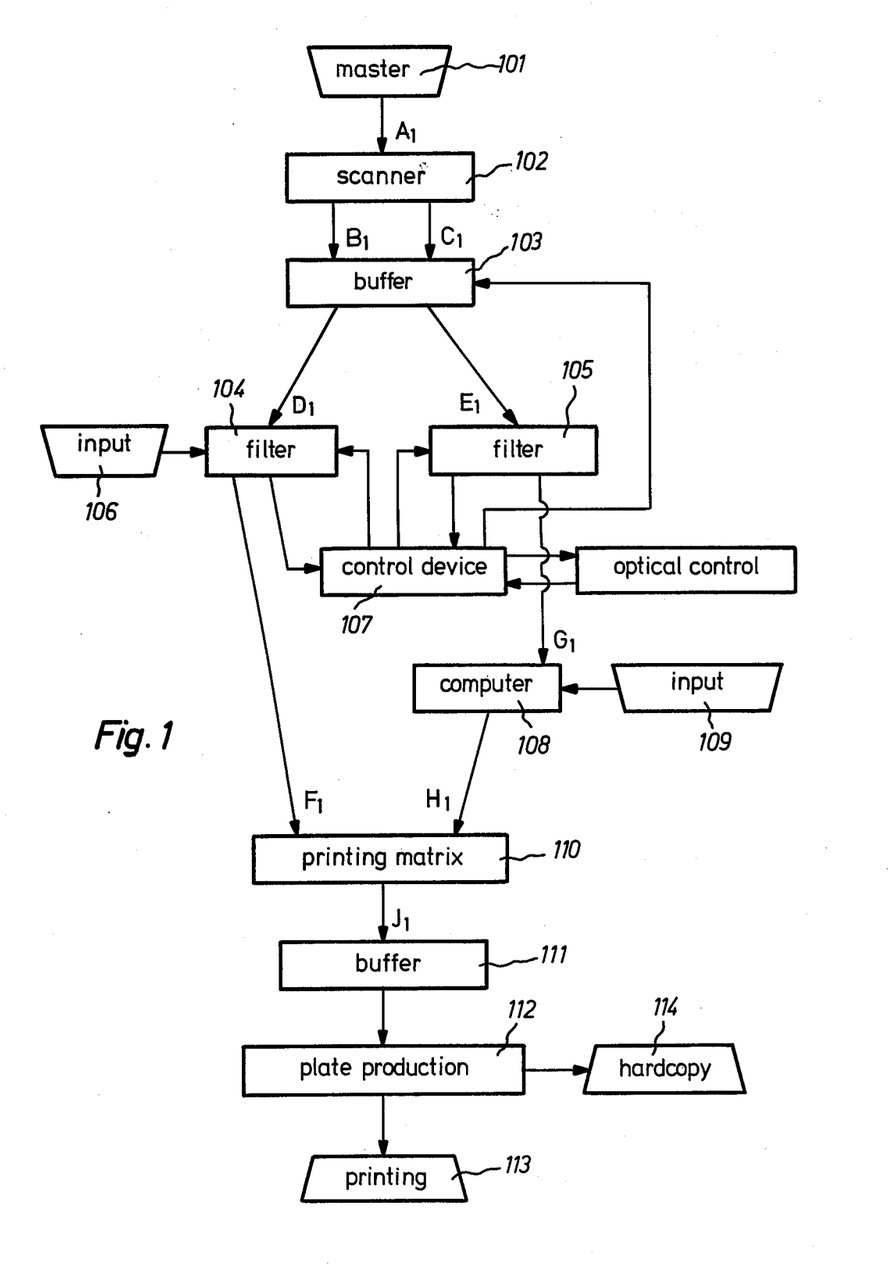
FIG. 1 is a schematic representation of a device for executing the method of the invention.

Referring to FIG. 1, the best mode for practicing the invention is illustrated in which a master 101 is scanned with a scanner 102 in accordance with the desired detailed resolution. Scanners in which the light $A_1$ reflected by or transmitted through the original master is divided in accordance with the sub-colors can be employed for the scanning of the scanner 102, for example a scanner of the type DC 350 manufactured by Dr.-Ing. Rudolf Hell GmbH, Kiel, Federal Republic of Germany. The light components assigned to the color separations are thereby respectively supplied to a color computer and are processed in the color computer. Usually, correction computers also follow, these allowing an influence on the output signal of the color computer controllable, in part, automatically and, in part, manually.

The color and correction computers generate analog or digital signals $B_1$ which respectively correspond to the corrected density value, i.e. the desired gray scale m. Of course, scanners having a plurality of scanning heads operating in parallel can be provided (v. for example, in accordance with the German Letters Pat. No. 2,107,738), these undertaking a multi-track scanning with the desired detail resolution and being employed in order to obtain faster scanning than with only one scanning head.

The scanners can also be controlled in a known manner by a computer, for example by a computer of the type R10 of Siemens AG, Federal Republic of Germany, which coordinates the acceptance of the signals and their transfer to a memory or to a computer system as is the case, for example, given the system CHROMACOM of Dr.-Ing. Rudolf Hell GmbH, Kiel, Federal Republic of Germany, which is available on the market.

In addition to the density signal $B_1$ corresponding to the gray scale m, the scanner can also generate a contour signal $C_1$. The pick-up and recording of the contour signal, however, can be foregone so as not to require too much memory space in the following buffer 103. In this case, the contours must be identified later with mathematical methods by way of gray scale comparisons.

The known possibilities for identifying contours are also set forth later on. Further, it can be advantageous to apply the delta modulation method to the density values. The only prerequisite required for the device of the present invention is that a contour signal and a density signal are generated. The density signal $B_1$ and, if necessary, the contour signal $C_1$ proceeds from the scanner 102 into a buffer 103. The buffer 103 stores the data obtained during scanning of the original image. Its memory capacity is based on the desired detailed resolution and on the size of the original image. In practice, disc memories are presently employed for such purposes (for example, as in the system CHROMACOM of Dr.-Ing. Rudolf Hell GmbH, Kiel, Federal Republic of Germany, for example one disc per sub-surface), so that the data obtained during scanning can be changed by following computers and filters, or can be replaced by other data obtained, for example, from other original images. Frequently, such disc memories already contain their own computer and thus form an independent subsystem, for example the disc drive of Siemens AG, Federal Republic of Germany, System 3948B.

The buffer 103 is further connected to a contour filter 104 and to a density filter 105 which process the signals obtained during scanning in such a manner that a data record freed of recording noises arises. This can occur in a known manner in that the surface portions of the same or approximately the same gradation value are combined and their mean gradation value is calculated. Moreover, it is advantageous to co-incorporate the printing conditions of the printing method employed in the editing of the scanning signal for the printing process, for example, in that the surface of the printing points is already taken into consideration in the contour signal. Therefore, an input 106 for the point size can be provided and the edges of the surface areas can, if need be, be smoothed so that the output signal $F_1$ of the contour filter 104 already corresponds to the contours of the reproduction. By so doing, the reproduction can coincide with the contours of the master except for digitization, given by the surface of the printing points. It has likewise been proven in practice to provide a central control device 107 which controls the data exchange of the buffer 103 with the contour filter 104 and the density filter 105 and which contains an optical monitoring device, for example a visual terminal. In an advantageous and known manner, the buffer 103, the contour filter 104 and the density filter 105 and the central control device can form a unit, for example the aforementioned system CHROMACOM manufactured by Dr.-Ing. Rudolf Hell GmbH, Kiel, Federal Republic of Germany, in which a following computer 108, a printing matrix computer 110 and a buffer 111 can also be incorporated in an advantageous manner. The tasks of the contour filter and the density filter, as well as that of the computer and printing matrix computer can, in particular, also be embodied as computer programs. Computer programs for contour identification and density filtration are known in great numbers from the literature concerning digital image processing (v. for example, Angewandte Szenenanalyse, DAGM Symposium, Karlsruhe, Oct. 10–12, 1979, Springer-Verlag, Berlin-Heidelberg-New York, 1979). On principle, therefore, a computer system which has the necessary memories (103 and 111) available or, respectively, which can drive such memories, which can process corresponding computer programs and which can be controlled from a control terminal (for example, type R30 of Siemens AG, Federal Republic of Germany) is suited to replace the aforementioned discrete components.

The output signal $G_1$ of the density filter 105 is supplied to a $\phi$ computer 108 which calculates the degrees of surface coverage $H_1$ of the individual surface areas having the same or approximately the same gradation value from the density signals, whereby an input 109 may be provided for inputting transfer characteristics to be taken into consideration in the following reproduction process, for example a disc copying characteristic and the printing characteristic is provided. The $\phi$ computer 108 can be realized in a known manner with the assistance of a memory from which the $\phi$ value or, respectively, the degree of surface coverage $H_1$ belonging to the density signal is fetched and can contain a computer in order, for example, to calculate a linearized characteristic from individual, stored characteristic points. The $\phi$ computer 108 can also be advantageously replaced by a computer program which, either by means of allocation in a matrix or by means of one or more approximation algorithms (for example, polonomial expression), determines that $\phi$ value or, respectively, the degree of surface coverage $H_1$ which corresponds to the desired or, respectively, to the calculated density stage.

From the signals for contour $F_1$ and degree of surface coverage $H_1$, the structure of the present invention generates a signal $J_1$ in a printing matrix computer 110 which specifies the positions of the points to be printed. This is described in detail hereinbelow.

The printing matrix computer 110 connected to a buffer 111, by means of which the printing plate production 112 with the following printing process 113 and a hard copy output 114 for producing proofs can be separated in a simple manner from the processing of the master.

The buffer 111 can, for example, again be a disc memory. Its size depends on the surface area of the reproduction and of the surface area of the printing points. When the edge length of a square printing point is, for example, 25 μm and the surface area of the reproduction is, for example, 17 cm ×25 cm, then the information as to whether the corresponding point is to be printed or color-free must accordingly be stored for 68,000,000 square points. The required memory capacity, therefore, is 68 Mbit for each subseparation in this case, The printing plate production 112 can, for example, occur in that, in a known manner, for example with a scanner, the data recorded in the buffer are exposed on a film from where they are suddenly copied onto the printing bed plate.

The printing plate production can also occur in an advantageous manner by a direct transfer of the data recorded in the buffer into a rotogravure cylinder (autotype rotogravure) or into a printing plate.

A hard copy can be previously produced in a known manner from film (for example CHROMALIN method of DuPont de Nemours, Orsay, France) or a printout can be produced with the assistance of a printing plate (proof copy).

A hard copy can also be directly produced from the buffer, for example, by ink jet or thermo printing.

Figure 2A:
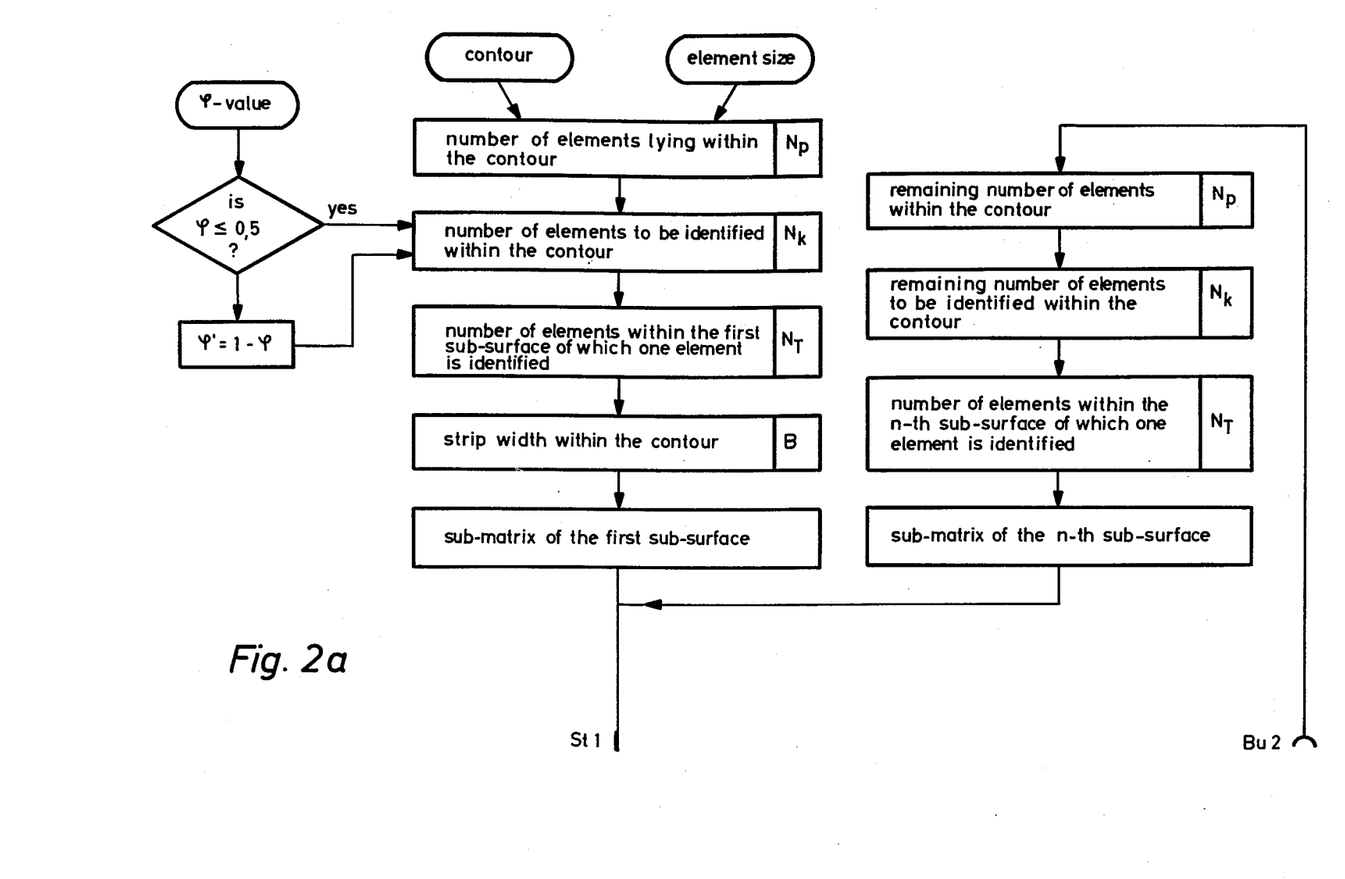
FIGS. 2a and 2b, taken together, constitute a flow chart relating to the identification of the distribution of printed points.
Figure 2B:
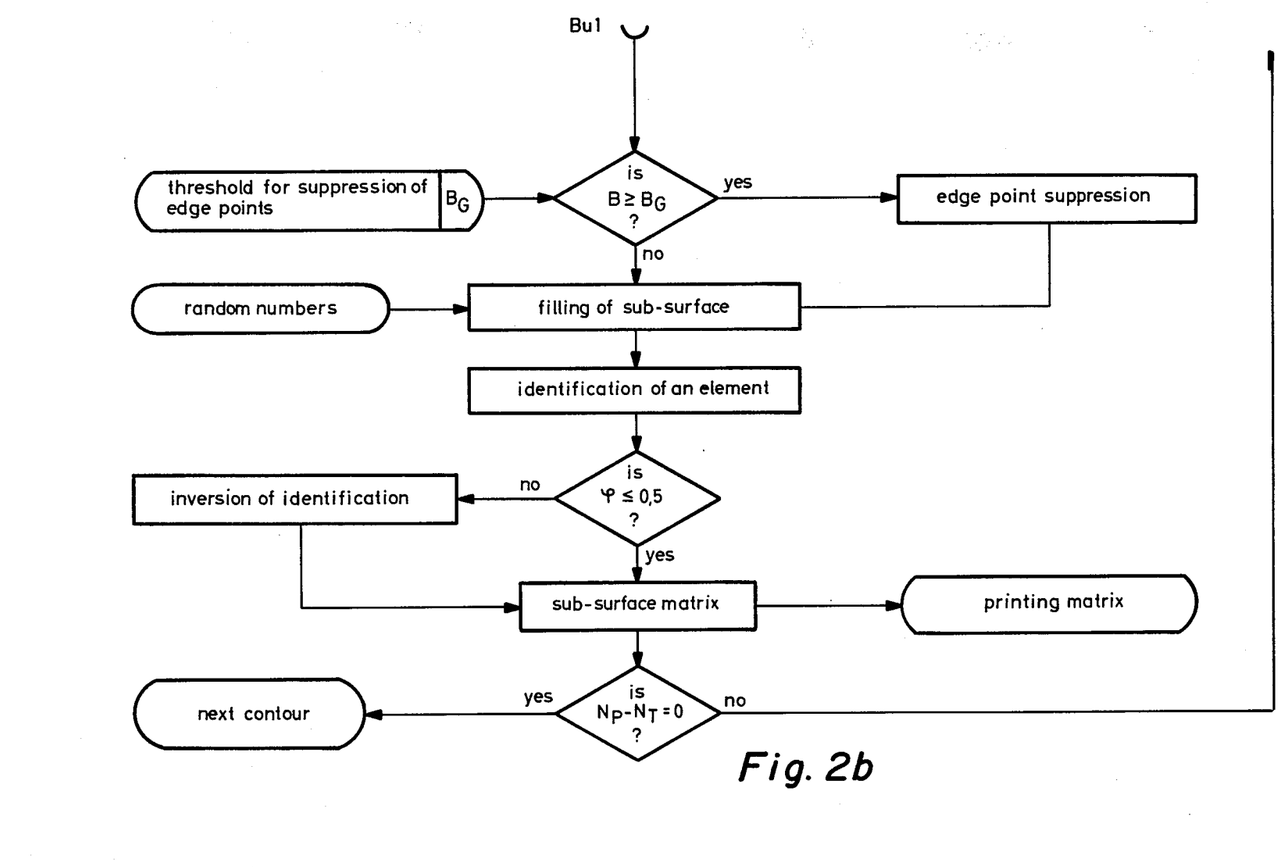

A flow chart for identifying the distribution of the printing points is illustrated in FIGS. 2a and 2b, an exemplary processing diagram of the printing matrix computer 110 in FIG. 1 or, respectively, the program sequence plan of the computer program substituting therefor being specified.

The number $N_p$ of printable points within the contour is first determined from the output signal $F_1$ of the contour filter 104 (FIG. 1), which can occur, for example, from the raster of smallest printable points at the recording side and from the boundaries of the surface portions of equal gradation value by counting off the raster elements lying within each contour (for example $N_p=860$). The degree of surface coverage $H_1$ states how many of the raster elements lying within the contour are to be printed. In order to guarantee as fast as possible a processing, a check is first carried out whether it is more favorable to identify the positions of the printing points or of the non-printing points. In case, for example, 3.85% of the 860 printable points within the contour are printing points, it is more favorable to identify their positions; whereas, in contrast thereto, it is more favorable to identify the positions of the non-printing points when, for example, 96.15% of the printable points are printing points. In both instances, the same plurality of points $N_k$ is to be identified, namely 860×3.85%=860 (100%−96.15%)=33 points. The limit, therefore, is reached at 50%.

In order to distribute these 33 points relatively uniformly within the 860 possible positions, the overall area, i.e. the surface framed by the contour, is advantageously provided with 33 sub-surfaces of approximately equal size when then exhibit $N_T$ elements. Remaining, therfore, are, for example First sub-surface $N_{T1}=26$ points from 860/33=33=26.061 and for the
Second sub-surface $N_{T2}=26$ points from 834/32=26.063 and for the
Third sub-surface $N_{T3}=26$ points from 808/31=26.065 and for the
Thirty-third sub-surface $N_{T33}=26$ points from 26/1=26.000,
of which respectively one point is to be identified or characterized. It is also advantageous to lend the individual sub-surfaces approximately the same shape, for example, approximately a quadratic shape. This can be achieved in that the contour is divided into individual strips having a width B, this being explained in greater detail below with respect to FIG. 3. The strip width B, for example, can be determined from the number $N_T$ of points lying within a sub-surface $$B = 5 \text{ from } \sqrt{26} = 5.099.$$

The output signal $F_1$ of the contour filter 104 in FIG. 1 can be a binary matrix, whereby, for example, the points lying within the contour are identified with L and the other points are identified with O. Sub-matrices can be produced therefrom whereby, therefore, the strip width B is considered in that all sub-matrices have, for example, five columns and the plurality of their lines is derived from the contour, for example by counting off $N_{Ti}$ elements with L for the $i^{th}$ sub-surface.

Twenty-six different random numbers which, for example, are fetched from a memory can, for example, be assigned to the twenty-six elements of the first sub-surface in the above example, so that a random matrix arises; and the selection of an element can, for example, occur in that the element with the highest numerical value is sought. In the example under consideration, this selected element corresponds to a printing point. The random numbers need not be really different, since that element which is not followed by one with a higher numerical value can be selected, i.e. the first, in case the same number accidentally occurs twice.

The element with the lowest numerical value or the element lying closest to a prescribed numerical value can also be sought. Individual elements of a sub-surface can also have no random number assigned thereto and, instead, for example, a number zero, i.e. no point is printed there, this being carried out in order to improve the reproduction of contours or in order to prevent accumulations of points at the edges or corners of the sub-surfaces. Various techniques are available for this purpose. A very simple technique, for example, is comparison to a threshold width $B_G$. When the strip width B is greater than the threshold width $B_G$, then the corresponding elements can be suppressed, i.e. the number zero can be assigned thereto, for example in the first and fifth elements in each line in case the threshold value $B_G=3$. The same method can also be applied to the columns so that a great number of possibilities are available. Likewise, suppression of edge points can be provided for the overall contour, the same, therefore, for example, allocating the numerical value zero to every element lying at the edge of the surface in order to surely prevent contour blurring.

The selection of a respective element from the elements of a sub-surface can occur according to the same pattern for all sub-surfaces; however, it can also be varied under different patterns. After processing a sub-surface, the number of overall points $N_p$ and the number of points to be identified within a contour $N_T$ can be reduced, so that the number $N_p$ then corresponds to the remaining number of printable points within the contour. Therefore, the processing of all sub-surfaces of a contour is concluded when the overall number of points within the contour $N_p$ is equal to the number of points to be identified within a contour $N_T$.

Figures 3, 3A:
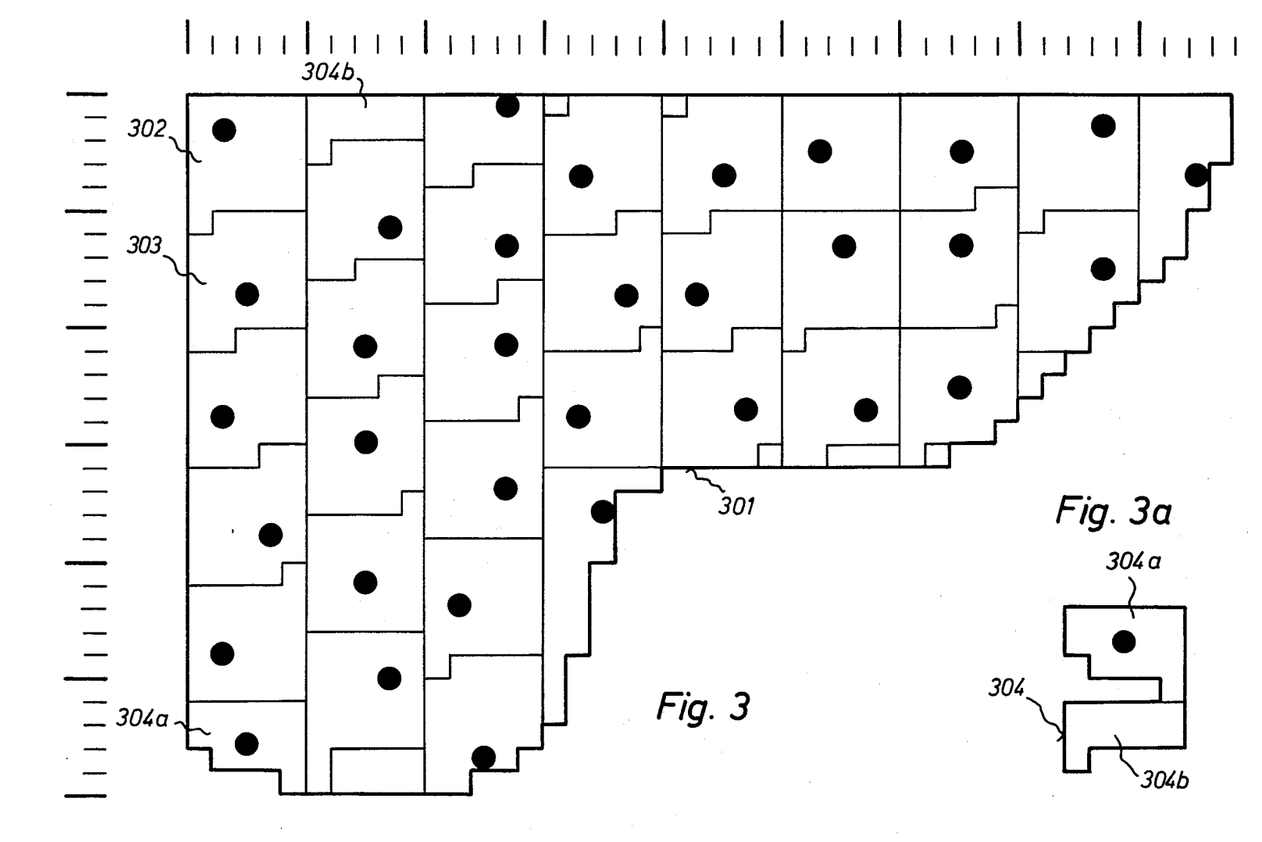

FIG. 3 illustrates an exemplary contour 301 which contains 860 printable points, i.e. raster elements at the recording side. The selected form of illustration is meant to convey an impression of the presentation pattern to be expected and, at the same time, is meant to sketch the processing for the individual sub-surfaces in a transparent and reproducible manner.

The greatest extent of the selected contour is 44 raster elements in the x-direction, 30 raster elements in the y-direction, so that the output signal $F_I$ of the contour filter 104 (FIG. 1) could, for example, be a binary matrix ($44 \times 30$)in which the elements lying within the contour would be identified with L and those lying outside the contour would be identified with O. Let the degree of surface coverage $H_I$(FIG. 1) be 3.85% so that all values calculated by way of example in the description with respect to FIGS. 2a and 2b can be considered. Therefore, the contour is first divided according to the calculated strip width (B=5 raster elements) and the calculated sub-surface size (for example $N_{T1}=26$ raster elements), so that approximately quadratic sub-surfaces, such as the sub-surfaces 302 and 303, arise as long as the edge of the overall surface does not disrupt this shape. The sub-surface, for example the subsurface 304, lying at the edge of the contour are frequently composed of two sub-portions, for example 304a and 304b. This is separately illustrated in FIGS. 3a. The length of such a sub-surface depends on the contour in that the sub-matrix assigned thereto contains, for example, 26 raster elements lying within the contour. The processing of individual sub-surfaces is described in detail on the basis of FIG. 4, where the calculation of the positions of the printing points is also explained. The printing points are entered at the positions calculated therefore, one can see that an edge point suppression within the sub-surfaces was employed for calculating their positions in order to exclude an accumulation at the edges and corners of the sub-surfaces which would otherwise be possible. An edge point suppression applying to the contour is indeed fundamentally possible, but is not executed here so that printing points can also be encountered at the edge of the contour.

FIGS. 4a, 4b, 4c, 4d illustrate the calculation of the positions of the printing points for the exemplary sub-surfaces 302, 303 and 304 from FIG. 3 in the individual processing steps according to FIG. 2. In the first step (FIG. 4a) the binary matrices 402, 403 and 404 are illustrated which arose in that the data of the contour matrix (not illustrated here) were transferred piece-by-piece in accordance with each subsurface, whereby the column number 5 is identical to the strip width B, and the line number is based on the plurality of elements of each sub-surface lying within the contour, whereby elements lying outside of the sub-surface are treated just like those which lie outside of the contour, i.e. they are set to zero. These binary matrices, therefore, contain precisely as many L's as their elements in the corresponding sub-surfaces, for example 26 for the first sub-surface.

In the second step (FIG. 4b) the edge points, for example, of the binary sub-surface matrices are suppressed, i.e. set to zero, for example the first column, as well as the first and last line and the second line in each case the first was not completely occupied (i.e. has fewer than five elements with L), or, respectively, the next-to-last line in case the last was not complete. As a result, the binary sub-surface matrix 412 arises from the binary sub-surface matrix 402, the sub-surface matrix 412 then exhibiting fewer elements with L due to the raster point suppression for example only nine instead of sixteen previously. The edge points of the entire contour could, for example, also be suppressed in that, first, all elements neighboring a zero are set to zero and, subsequently, the first and last lines and column are set to zero, insofar as this has not already occurred.

Figure 4A:
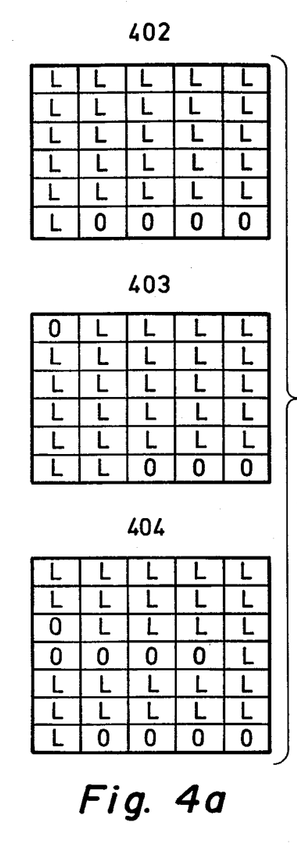
FIGS. 4a, 4b, 4c, 4d together form a compilation of intermediate results of individual processing steps in the identification of the positions of the printing points according to FIGS. 2a and 2b.
Figure 4B:
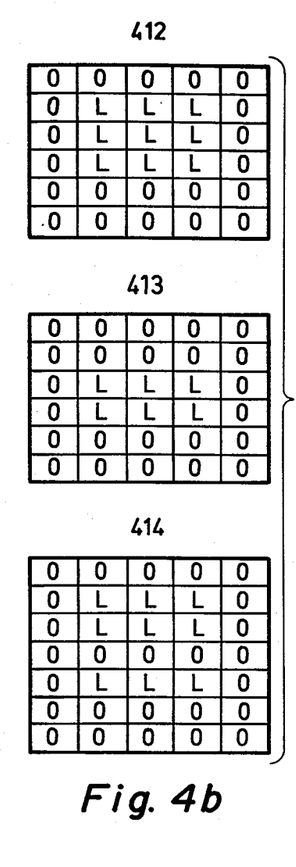
Figure 4C:
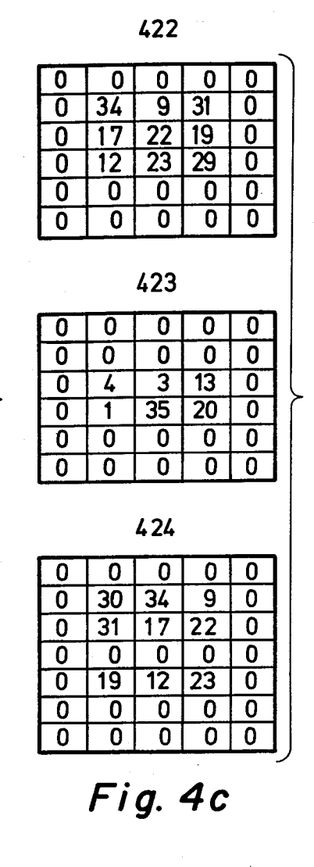
Figure 4D:
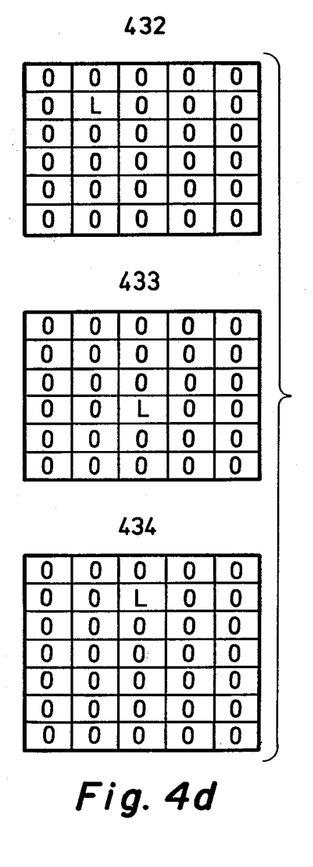

In the third steps (FIG. 4c) the elements which have a L are overwritten with a random number. In this example, the random numbers are taken from the following random number vector which contains 37 different numerical values and which was cyclically run through:

34; 9; 31; 17; 22; 19; 12; 23; 29; 4; 3; 13; 1; 35; 20; 11; 28; 6, 36; 2; 14; 27; 16; 21; 7; 18; 33; 25; 5; 15; 37; 8; 24; 26; 10; 32; 30.

After the second processing step of the edge point suppression, the first sub-surface matrix 412 still contains 9 elements with L and is overwritten at these locations with the first 9 elements of the random number vector, whereby a random matrix 422 arises. The second sub-surface matrix 413 contains the following six elements of the random number vector. As can be easily reproduced on the basis of FIG. 3, the following three sub-surface matrixes again contain six, six and nine random numbers so that the random number vector has been traversed once in the sixth sub-surface matrix 424 after the first element and the numbers are again read in from the beginning. As has already been mentioned, random numbers can also be read in which, for example, can be obtained with a noise generator, i.e. are not really random.

In the fourth step (FIG. 4d) one element of each sub-surface matrix is selected and marked with L, for example, the one with the highest numerical value (in case the same random number cannot occur twice in a sub-surface matrix). This matrix, for example 432, which thus contains only one L must also be inverted in the case that $H \geq 50\%$ so that it contains only one zero. By so doing, the position of the one printing or, respectively, of the one non-printing point (in case $H \geq 50\%$) is fixed in that an L is assigned to all printing points and a zero is assigned to all non-printing points. The individual sub-surface matrices are subsequently transferred and combined in a binary matrix which corresponds to the contour matrix. This is again not illustrated here.

Figure 5A:
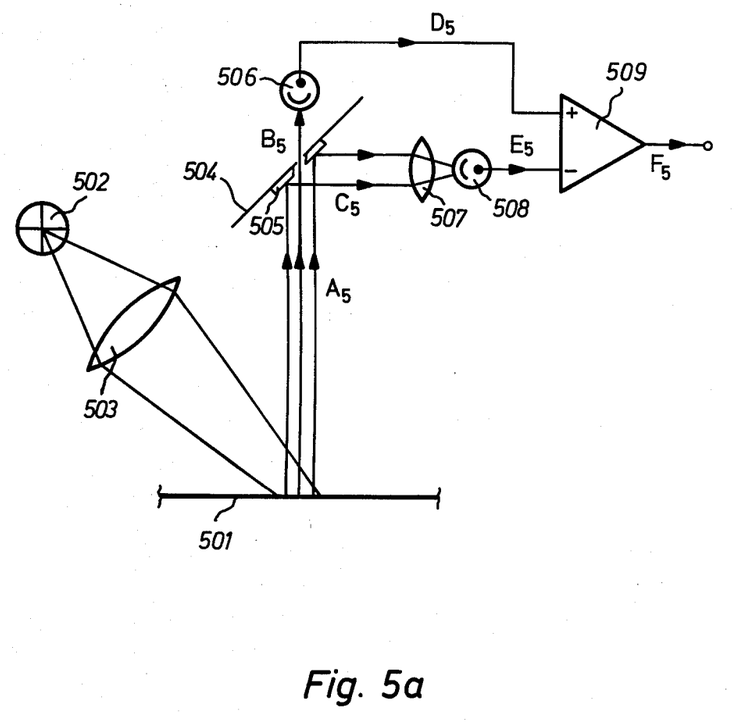
FIGS. 5a and 5b are schematic representations of arrangements for generating a contour signal by an optical surrounding field scanning (FIG. 5a) or, respectively, by way of an analog computer (FIGS. 5b)

FIG. 5a illustrates a known circuit diagram (v. for example German Auglegeschrift No. 10 39 842) for identifying contour lines whereby a point and its surrounding field are simultaneously scanned. The original master 501 is illuminated by a light source 502 via a suitable optical device 503 which, for example, can be a lens or lens system or a light wave guide. The light $A_5$ returned from the master is divided by an optical device 504 which is partially mirrored (505) and contains a bore therethrough, so that a portion of the light $B_5$ returned from the scanning point is supplied to an opto-electrical transducer 506 and a portion of the light $C_5$ returned from the outer field of the scanning point is focused (507) and supplied to an opto-electrical transducer 508. As a result, an electrical signal $D_5$ arises which is proportional to the light returned from the scanning point and an electrical signal $E_5$ arises which is proportional to the light return from the outer field of the scanning point. By comparing the two electrical signals to one another, one obtains a statement as to whether the light component returned from the scanning point differs from that of its outer field. The contour signal is therefore obtained as the output signal $F_5$ of a differential amplifier 509.

Figure 5B:
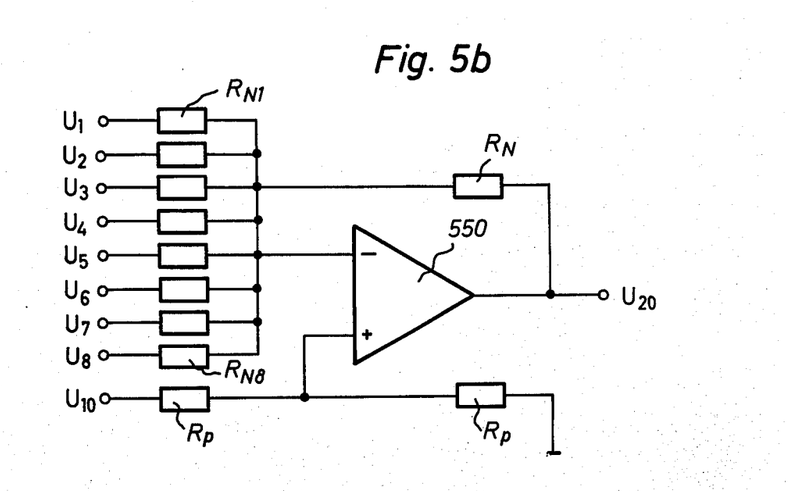

FIG. 5b illustrates a known circuit diagram (v. for example, U. Tietze, Chr. Schenk, Halbleiterschaltungstechnik, Springer-Verlag, Berlin-Heidelberg, New York)for a comparison of voltage signals. This circuit can be employed for generating a contour signal in that the original master is scanned raster-like, the light signals reflected or transmitted by the scanning points are converted into voltage signals in opto-electrical transducers in the manner discussed above, and such signals are supplied to a differential amplifier 550. The voltage signal $U_{10}$ assigned to the measuring point is thereby compared to the signal generated from the voltage signals $U_1 \ldots U_8$ which are assigned to the neighboring scanning points, so that the output signal $U_{20}$ of the differential amplifier 550 is the desired contour signal. When, for example, the resistors are selected in such a manner that $R_p = R_N$ and $R_{N1} = R_{N2} = \ldots R_{N8} = 8R_p$, then the contour voltage signal is $$U_{20} = U_{10} - \frac{1}{8} \cdot \sum_{i=1}^{8} U_i.$$

Figure 6:
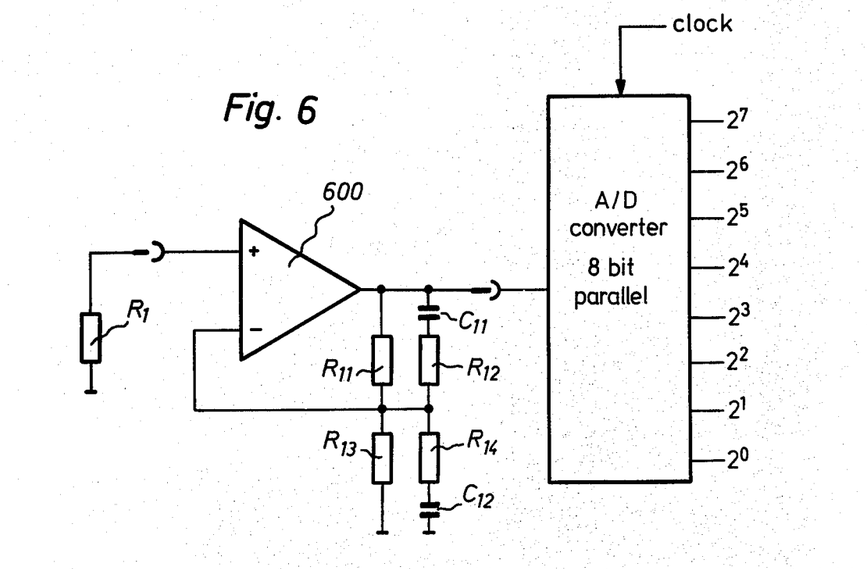
FIG. 6 is a schematic representation of an arrangement for generating random numbers.

FIG. 6 illustrates an arrangement for generating random numbers, whereby the random voltage values of a noise source, for example of a resistor $R_1$, are amplified and converted into digital form. To this end, a differential amplifier 600 can be connected in a known manner as a band pass amplifier, so that the voltage values available at its output are not disrupted by voltages which may potentially not be random, for example ripple voltages. The output voltages of the differential amplifier 600 can be supplied to an analog-to-digital converter which converts the analog voltage signal applied to its input into, for example, an 8-bit digital signal in a known manner (the analog-to-digital converter manufactured by, for example, TRW, known as the type TDC 1007 J), whereby the conversion of the momentary, analog voltage signal only occurs when the clock input receives a corresponding signal and the digital signal at the output of the analog-to-digital converter remains stored until the further clock signal triggers the calculation of the next digital signal. Therefore, the clock input can, for example, be directly driven by the printing matrix computer 110 of FIG. 1 in that a new digital signal is always calculated when the corresponding element of a sub-surface matrix, for example of the sub-surface matrix 412 of FIG. 4, has the value L and is to be overwritten with a random number.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A method for producing printing forms using irregularly-distributed printing points, comprising the steps of:
   opto-electrically scanning individual surface elements of a picture original at a desired resolution;
   assigning a gray scale to each surface element and determining gradation values;
   forming sub-surfaces of the surface elements which have at least approximately the same gradation value and in accordance with the actual boundaries of at least approximately the same gradation value of the original image; and
   reproducing each sub-surface in accordance with its gradation value with a plurality of statistically-distributed printing points whose overall surface coverage corresponds to the gradation value of the respective sub-surface.

2. The method of claim 1, wherein the step of determining gradation values is further defined as:
   recognizing the image contour of a surface element.

3. The method of claim 2, wherein the step of recognizing image contour is further defined as:
   comparing the density values of the surface elements; and combining those surface elements of at least approximately the same density into sub-surfaces.

4. The method of claim 2, wherein the step of forming sub-surfaces is further defined as:
   combining surface elements which lie between two contour lines and which have at least approximately the same density.

5. The method of claim 1, and further comprising the step of:
   suppressing individual surface elements of a sub-surface at the edges of such sub-surface.

* * * * *

UNITED STATES PATENT AND TRADEMARK OFFICE
CERTIFICATE OF CORRECTION

PATENT NO. : 4,485,397
DATED : November 27, 1984
INVENTOR(S) : Karl Scheuter and Gerhard Fischer It is certified that error appears in the above—identified patent and that said Letters Patent is hereby corrected as shown below:

On the title page:

Change "[73] Assignee: Ing. Rudolf Hell GmbH" to read --Dr.-Ing. Rudolf Hell GmbH--.

Signed and Sealed this

Second Day of July 1985

[SEAL]

*Attest:*

DONALD J. QUIGG

*Attesting Officer*  *Acting Commissioner of Patents and Trademarks*